United States Patent
Tanaka et al.

(10) Patent No.: US 6,542,148 B1
(45) Date of Patent: Apr. 1, 2003

(54) CURSOR DISPLAY DEVICE FOR USE WITH A MULTI-DISPLAY SYSTEM

(75) Inventors: Atsushi Tanaka, Tokyo (JP); Koki Sukamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/538,724

(22) Filed: Mar. 30, 2000

(30) Foreign Application Priority Data

Mar. 31, 1999 (JP) ........................................... 11-090496

(51) Int. Cl.⁷ ................................................ G09G 5/00
(52) U.S. Cl. ......................... 345/157; 345/1.1; 345/1.3
(58) Field of Search .............................. 345/1.1, 1.3, 4, 345/5, 672, 684, 687, 157

(56) References Cited

U.S. PATENT DOCUMENTS 5,523,769 A * 6/1996 Lauer et al. ................. 345/1.1
5,784,035 A    7/1998 Hagiwara et al.
5,969,697 A * 10/1999 Tani et al. ................... 345/1.1

FOREIGN PATENT DOCUMENTS

JP (HEI 4[1992]-491 * 1/1992 ............ G09G/5/00

* cited by examiner

*Primary Examiner*—Matthew Luu
(74) *Attorney, Agent, or Firm*—Birch, Stewart, Kolasch & Birch, LLP

(57) ABSTRACT

A multi-display system includes cursor generating means for generating, upon a cursor generation request, four individual cursor patterns by computing a hot spot, a cursor pattern and the like, and cursor transforming means which compares, upon a cursor movement request, the relative positions on display ranges, cursor-display designation coordinates, and cursor pattern sizes, selects a given cursor from those four cursors, and adds an offset value to the cursor-display designation coordinates of said selected cursor.

4 Claims, 2 Drawing Sheets

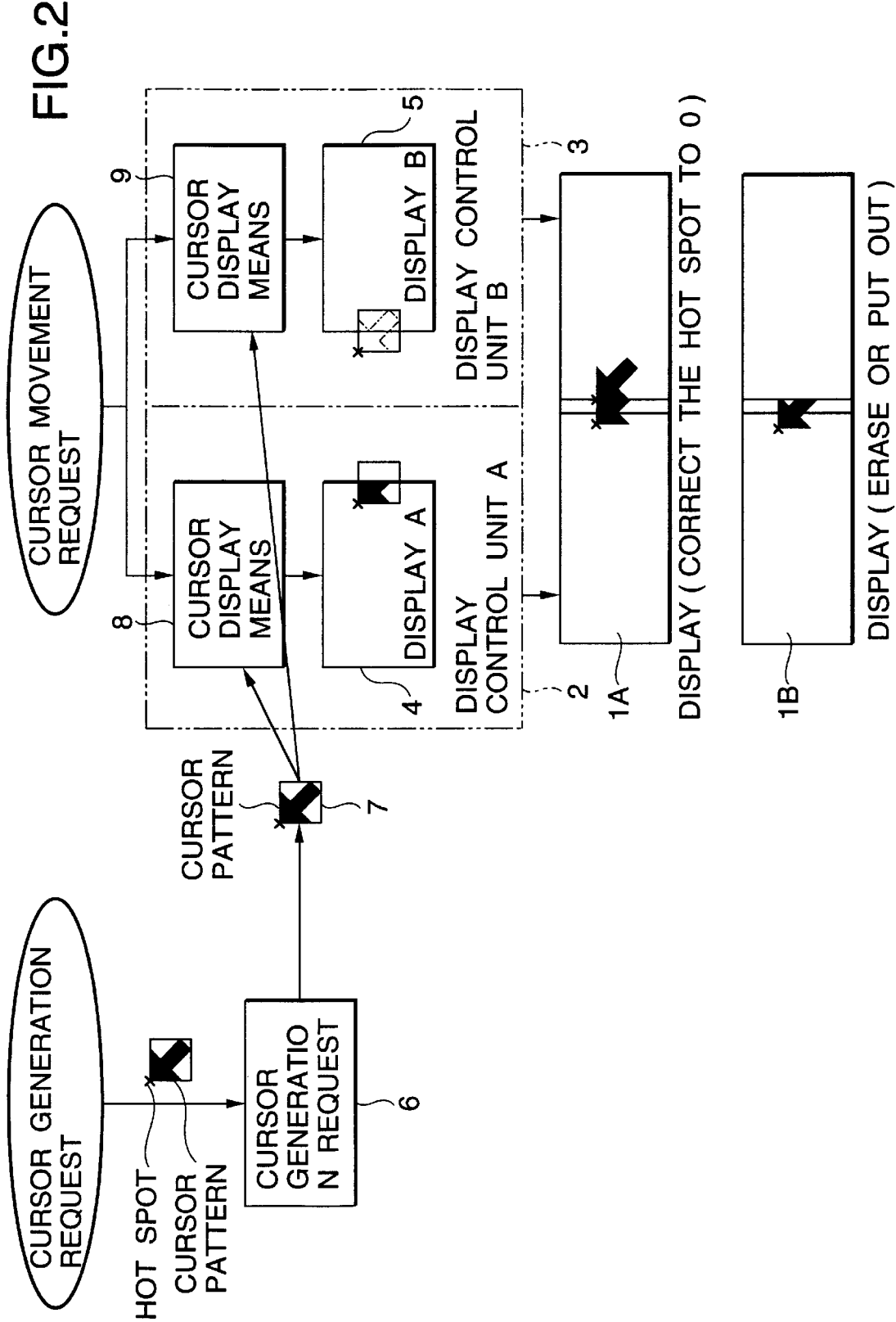

CURSOR DISPLAY DEVICE FOR USE WITH A MULTI-DISPLAY SYSTEM

BACKGROUND OF THE INVENTION

The present invention relates to a cursor displaying technique in a multi-display system.

In the multi-display system to which the present invention is directed, plural sets of displays and display control units respectively associated therewith, a plurality of displays are physically juxtaposed to form a single seamless large display, and a single cursor is smoothly movable between the plurality of displays.

A conventional cursor display system will be described with reference to FIG. 2.

As shown in 1A and 1B, displays 4 and 5 which are controlled by display control units 2 and 3 are physically closely juxtaposed to form a single, seamless display.

When the multi-display system is driven, then an application program or an operation system issues a cursor generation request. In response to the request, cursor generating means 6 computes a hot spot, a cursor pattern, and the like to generate a cursor pattern 7. The generated cursor pattern 7 is transferred to cursor display means 8 and 9 of the display control units 2 and 3.

The display control unit 2 or 3 controls the individual display 4 or 5 by the application program, and depicts a picture in accordance with a request by the application program, and those display control units have their own cursors, respectively. A specific example to which the present invention is applied is Windows NT work station of Microsoft Corporation.

To realize a smooth movement of a single cursor between the displays 4 and 5, the cursor generation request and the cursor movement request are transferred to the display control units 2 and 3, the display control units 2 and 3 move their own cursors to a designated position in consideration with the display positions of the displays and 4 and 5 assigned in control to those control units. More specifically, when the designated position is within a display control area of one of the display control units, the cursor is moved to the display control area. When it is not within the display control area, the cursor is put out. As a result, a single cursor is displayed in the composite display, and in this state, a cursor movement request is issued, so that it is smoothly movable.

A cursor movement request that is issued from a relative coordinate device, e.g., a computer mouse, is designated by the coordinates of a point of the cursor, called a hot spot. Usually, the cursor display means control their individual displays, respectively. When the hot spot coordinates of a cursor movement request are designated so as to be out of the display control area of one of the display control units, the display control unit corrects the hot spot coordinates so that the hot spot defined by the coordinates is located within its display control area or the cursor having such a hot spot is put out, in order that the cursor is confined within the display control area of the display control unit. In the windows NT work station, for example, when the hot spot coordinates that are not within its display control area, the coordinates are automatically processed to be within its display control area.

In the multi-display system mentioned above, when a cursor movement request containing a hot spot to be placed at the boundary between the individual displays, a cursor pattern having the hot spot is correctly displayed within the display control area within which the coordinates of the hot spot are located. However, when the hot spot is somewhat out of the display control area, the coordinates of the hot spot are corrected to be within the display control area or the cursor is put out in display. The resultant cursor displayed does not take an exact pattern of a single cursor, as shown in the displays 1A and 1B.

As described above, the conventional cursor display technique is disadvantageous in that when the cursor moves past the boundary between the individual displays, which are to be combined, the cursor pattern displayed changes to give rise of unnatural visual feeling.

SUMMARY OF THE INVENTION

Accordingly, an object of the present invention is to provide a seamless display without any deformation of a cursor pattern displayed when a cursor moves past a boundary of the individual displays combined into the seamless display, without any alteration of the display control units.

According to the present invention, there is provided a first A cursor display device for use with a multi-display system having a plurality of displays, display control units for controlling the displaying operations of the displays, wherein the plurality of displays are closely juxtaposed, the cursor display device comprising: cursor generating means for generating, upon a cursor generation request, four individual cursor patterns, equal in configuration, having hot spots located at the upper left, the upper right, the lower right and the lower left coordinate points in a cursor pattern rectangular, and for attaching to the hot spots offset values as attribute values of the hot spots; and cursor transforming means which compares, upon a cursor movement request, the relative positions on display ranges, cursor-display designation coordinates, and cursor pattern sizes, selects an intended cursor from the four cursors, and adds an offset value to the cursor-display designation coordinates of the selected cursor.

A second cursor display device for use with a multi-display system is based on the first cursor display device, specified such that when a configuration of the selected cursor is within a display control area of the cursor transforming means, but the cursor display designation coordinates of the selected cursor is not within the display control area, the cursor transforming means detects a position in the display control area to which the cursor display designation coordinates have shifted, and when the detected position is located in the upper portion, the cursor transforming means selects the cursor of which the hot spot is located at the lower right or lower left coordinate point, when the detected position is located in the lower portion, the cursor transforming means selects the cursor of which the hot spot is located at the upper right or upper left coordinate point, when the detected position is located in the right portion, the cursor transforming means selects the cursor of which the hot spot is located at the upper left or lower left coordinate point, and when the detected position is located in the left portion, the cursor transforming means selects the cursor of which the hot spot is located at the upper right or lower right coordinate point.

A third cursor display device for use with a multi-display system is based on the first cursor display device, specified such that the cursor transforming means predicts a cursor movement direction and selects one cursor from the four cursors in advance.

A fourth cursor display device for use with a multi-display system having a plurality of displays, display control units for controlling the displaying operations of the displays, wherein the plurality of displays are closely juxtaposed, the cursor display device comprising: cursor transforming means which compares, upon a cursor movement request, the relative positions on display ranges, cursor-display designation coordinates, and cursor pattern sizes, sets the hot spot of the cursor generated by the cursor generating means to any of the upper left, the upper right, the lower right and the lower left coordinate points in a cursor pattern rectangular, and adds the offset value to the cursor-display designation coordinates of the selected cursor.

BRIEF DESCRIPTION OF THE DRAWINGS

FIG. 2 is a diagram showing an arrangement of a conventional cursor generating system.

DETAILED DESCRIPTION OF THE PREFERRED EMBODIMENTS

<Embodiment 1>

Figure 1:
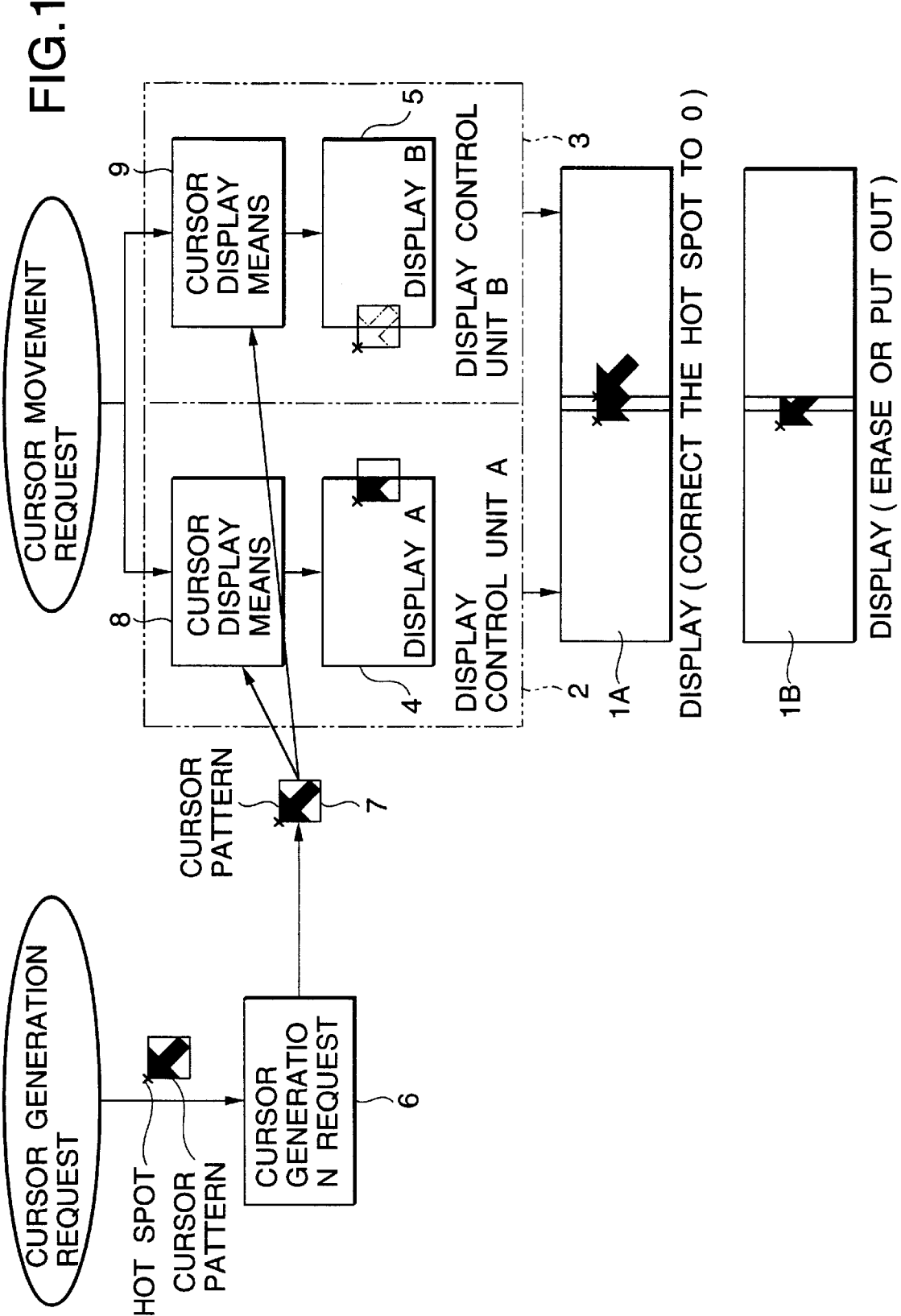
FIG. 1 is a diagram showing an embodiment 1 of the present invention.

FIG. 1 is a diagram showing an embodiment 1 of the present invention.

In the figure, reference numeral 6 is cursor generating means which generates, upon a cursor generating request by an application program or an operating system, four cursors 7A to 7D, which have respectively hot spots at the upper left, upper right, lower right and lower left positions, and hold their differences from original hot spots; 8 and 9 are cursor transforming means for selecting a proper cursor from the four cursors in accordance with a designated position by a cursor movement request issued from a relative coordinate device, e.g., a computer mouse and a hot spot derived from the cursor generating means 6; 2 and 3 are display control units for controlling the displaying operations of displays 4 and 5 respectively assigned thereto in control; 1 is a single, seamless composite display formed by physically and closely juxtaposed the display 4 controlled by the display control unit 2 and the display 5 controlled by the display control unit 3.

The operation of the embodiment will be described. In a multi-display system to which the present invention is directed, the displays 4 and 5 have each the size of 1280 dots×1024 dots, and an overall (composite) display that is formed by closely juxtaposing those displays 4 and 5 has a size of 2560 dots×1024 dots. Further, a drawing request and a cursor movement request are designated in terms of the coordinates on the composite display.

Additionally, in the embodiment, a pattern size of a cursor of which the generation will be requested is 16 dots×16 dots, and a hot spot is defined by the coordinates (0, 0).

When an application program or an operating system issues a cursor generation request, the cursor generating means 6 responsively generates four individual cursors, or cursors 7A to 7D, and stores those cursors into a memory. The patterns of those cursors are substantially the same except their hot spots. Specifically, the hot spot of the cursor 7A is located at the upper left position (0, 0) in the cursor pattern; the hot spot of the cursor 7B is located at the upper right position (16, 0) in the cursor pattern; the hot spot of the cursor 7C is located at the upper right position (16, 16) in the cursor pattern; and the hot spot of the cursor 7D is located at the upper right position (0, 16) in the cursor pattern. Those cursors hold differences of their hot spots from the original hot spots as the coordinate offset values. In the embodiment, the coordinates of the original hot spot are (0, 0), and hence the offset value is equal to each of the hot spots of the four cursors.

An operation of the multi-display system when it receives a cursor movement request from a relative coordinate device, e.g., a computer mouse. The cursor movement request is designated in terms of the coordinates of a point called a hot spot of a cursor. The cursor movement request is transferred from the computer mouse to the display control units 2 and 3 in the form of the coordinates on the size of an overall display (composite display) composed by closely juxtaposing individual displays, while being unconscious of the display configuration.

In the embodiment, operation description will be given by use of a cursor movement request to move the cursor to a point defined by the coordinates (1272, 200). This cursor movement request is transferred from the computer mouse to both the display control units 2 and 3. The display control unit 2 covers a display screen area ranging from the coordinates (0, 0) to (1279, 1023) (this area will be referred to as a display control area). Therefore, there is no need of transforming the designated coordinates (1272, 200) into the coordinates of the display control area assigned to the display control unit 2.

Since the hot spot coordinates (1272, 200) as the receiving coordinates are within the display control area assigned to the display control unit 2, the cursor transforming means 8 of the display control unit chooses the cursor 7A, adds an offset value (0, 0) of the cursor 7A to it, and moves the cursor to the hot spot defined by the cursor display coordinates (1273, 200).

The display control unit 3 has its display control area ranging from the coordinates (1280, 0) to (2559, 1023). Accordingly, the hot spot coordinates (1272, 200) of the receiving coordinates are not within the display control area of the display control unit 3. As described above, in the embodiment, the size of the cursor pattern is 16 dots×16 dots, and a hot spot is defined by the coordinates (0, 0). Therefore, it may be considered that the receiving coordinates lie at the left end of the display control area of the display control unit 3.

At this time, the cursor transforming means 9 first transforms the cursor-movement-request coordinates (1272, 200) into the coordinate system of the display control area of it, and obtains a hot spot of the cursor in the form of the coordinates (−8, 0) which is the result of subtracting the offset value (1280, 0) of the display control unit 3 from it. Further, at this time, the coordinates (−8, 0) are shifted out of the left side end of its display control area, and hence the cursor transforming means 9 chooses the cursor 7B; adds an offset value (16, 0) of the cursor 7B to it; and obtains a hot spot coordinates (7, 200) of the cursor to finally be displayed within its display control area. The cursor is actually moved as defined by the hot spot coordinates. Judgement to choose the cursor 7B will be described later.

Thus, the hot spot of the cursor is within the display control areas of both the display control units 2 and 3. Therefore, no error is created even when the multi-display system of the invention is applied to Windows NT. Further, such unwanted phenomena that partial cutting or overlapping view of the cursor pattern does not happen. The cursor will be moved and displayed with an exact pattern as shown in the composite display 1.

The rules to select a cursor from the cursors 7A to 7C by the cursor transforming means 8 and 9 will be described. It is assumed that the width of a cursor pattern is W, the height is H, and the coordinates of a hot spot after the coordinates transformation into the coordinate system of the display control area is (X, Y). The rules to confine a hot spot within a display control area by each cursor transforming means are:

1) To put out the cursor display when the coordinates (X, Y) are located away from the display control area each cursor transforming means by a distance of W or H dots or longer.
2) To choose the cursor pattern 7A when the coordinates (X, Y) are within the display control area.
3) To choose the cursor pattern 7B or 7C when the coordinates (X, Y) are shifted to the left from the display control area but except the case 1) above.
4) To choose the cursor pattern 7C or 7D when the coordinates (X, Y) are shifted to the upper side from the display control area but except the case 1) above.
5) To choose the cursor pattern 7A or 7D when the coordinates (X, Y) are shifted to the right from the display control area but except the case 1) above.
6) To choose the cursor pattern 7A or 7B when the coordinates (X, Y) are shifted to the right from the display control area but except the case 1) above.

<Other Embodiment 1>

In the embodiment 1, a proper cursor pattern is selected from the four cursor patterns every time cursor movement request is issued. If required, the cursor pattern may be selected only when the rules 1) to 6) above change. In most cases, the cursor is moved by use of the relative coordinate device, e.g., a mouse. Therefore, the coordinates of the cursor after its movement may be predicted on the basis of the moving direction of the cursor. Therefore, a range of the cursor movement is predicted and the judgement of the rules 1) to 6) may be made in advance.

<Other Embodiment 2>

The cursor generating means for generating four cursors is indispensably used in the embodiment 1. Alternatively, the rules 1) or 6) are judged every cursor movement, and only the hot spot, not the cursor, is selected on the basis of the result of the judgement.

In a multi-display system in which a plurality of displays are physically and closely juxtaposed into a single seamless composite display, when a cursor moves past a boundary between the displays forming the composite display, the cursor will move while keeping an exact cursor pattern, viz., without any change of the cursor display pattern, and partial cutting or overlapping view of the cursor pattern. Such an excellent cursor display technique is achieved without any alteration of the display control units.

What is claimed is:

1. A cursor display device for use with a multi-display system having a plurality of displays, said plurality of displays being closely juxtaposed, and display control units for controlling the displaying operations of said displays;

said cursor display device comprising:

cursor generating means for generating, upon a cursor generation request, four individual cursor patterns, equal in configuration, having hot spots located at the upper left, the upper right, the lower right and the lower left coordinate points in a cursor pattern rectangular, and for attaching to the hot spots offset values as attribute values of the hot spots; and cursor transforming means which compares, upon a cursor movement request, the relative positions on display ranges, cursor-display designation coordinates, and cursor pattern sizes, selects an intended cursor from the four cursors, and adds an offset value to the cursor-display designation coordinates of the selected cursor.

2. The cursor display device according to claim 1, wherein when a configuration of the selected cursor is within a display control area of said cursor transforming means, and the cursor display designation coordinates of the selected cursor is not within said display control area, said cursor transforming means detects a position in said display control area to which the cursor display designation coordinates have shifted, when the detected position is located in the upper portion, said cursor transforming means selects the cursor of which the hot spot is located at the lower right or lower left coordinate point, when the detected position is located in the lower portion, said cursor transforming means selects the cursor of which the hot spot is located at the upper right or upper left coordinate point, when the detected position is located in the right portion, said cursor transforming means selects the cursor of which the hot spot is located at the upper left or lower left coordinate point, and when the detected position is located in the left portion, said cursor transforming means selects the cursor of which the hot spot is located at the upper right or lower right coordinate point.

3. The cursor display device according to claim 1, wherein said cursor transforming means predicts a cursor movement direction, and selects one cursor from the four cursors in advance.

4. A cursor display device for use with a multi-display system having a plurality of displays, said plurality of displays being closely juxtaposed, and display control units for controlling the displaying operations of said displays, said cursor display device comprising:

cursor generating means for generating, upon a cursor generation request, a cursor pattern to which an offset value of the hot spot is attached as an attribute; and cursor transforming means which compares, upon a cursor movement request, the relative positions on display ranges, cursor-display designation coordinates, and cursor pattern sizes, sets the hot spot of the cursor generated by said cursor generating means to any of the upper left, the upper right, the lower right and the lower left coordinate points in a cursor pattern rectangular, and adds the offset value to the cursor-display designation coordinates of said selected cursor.

* * * * *